(12) United States Patent
Yoo (10) Patent No.: US 8,165,610 B2
(45) Date of Patent: Apr. 24, 2012

(54) INTERACTIVE MESSAGE SERVICE SYSTEM AND ITS METHOD

(75) Inventor: Chung Man Yoo, Seoul (KR)

(73) Assignees: Eung Jin Kim, Gyeonggi-Do (KR); Sung Wook Choi, Seoul (KR)

( * ) Notice: Subject to any disclaimer, the term of this patent is extended or adjusted under 35 U.S.C. 154(b) by 953 days.

(21) Appl. No.: 12/094,129

(22) PCT Filed: Nov. 23, 2006

(86) PCT No.: PCT/KR2006/004936
§ 371 (c)(1),
(2), (4) Date: May 16, 2008

(87) PCT Pub. No.: WO2007/078054
PCT Pub. Date: Jul. 12, 2007

(65) Prior Publication Data
US 2009/0163231 A1    Jun. 25, 2009

(30) Foreign Application Priority Data

Nov. 25, 2005 (KR) .......................... 10-2005-0113684

(51) Int. Cl.
*H04W 4/00* (2009.01)
*H04M 3/42* (2006.01)
*H04L 29/06* (2006.01)
*H04L 29/08* (2006.01)

(52) U.S. Cl. .................. 455/466; 455/414.1; 455/414.3; 455/414.4

(58) Field of Classification Search ............... 455/414.1, 455/414.3, 414.4, 466
See application file for complete search history.

(56) References Cited

U.S. PATENT DOCUMENTS

| | | | |
|---|---|---|---|
| 6,597,918 B1 * | 7/2003 | Kim | 455/466 |
| 2003/0100322 A1 | 5/2003 | Jeon | |
| 2003/0114140 A1 * | 6/2003 | Iivonen et al. | 455/406 |
| 2004/0157628 A1 * | 8/2004 | Daniel et al. | 455/466 |
| 2004/0186889 A1 * | 9/2004 | Washburn | 709/206 |
| 2004/0259577 A1 * | 12/2004 | Ackley | 455/466 |
| 2005/0004971 A1 | 1/2005 | Liao | |

FOREIGN PATENT DOCUMENTS

WO    WO 02/082836    10/2002

* cited by examiner

*Primary Examiner* — Marisol Figueroa
(74) *Attorney, Agent, or Firm* — IPLA P.A.; James E. Bame

(57) ABSTRACT

The present invention relates to a system and method of transmitting text messages to and from mobile phones. In further detail, the invention presents an interactive message service (IMS) system and related methods that are characterized by composing the inquiring party's message in a multiple-choice question format; and by sending back the inquiring party a text message specifying the responding party's choice, which is made by pressing the numeric key corresponding to the choice, if and when the responding party makes a choice.

2 Claims, 7 Drawing Sheets

INTERACTIVE MESSAGE SERVICE SYSTEM AND ITS METHOD

TECHNICAL FIELD

The present invention relates to a system and method of transmitting text messages to and from mobile phones. In further detail, the invention presents an interactive message service (IMS) system and related methods that are characterized by composing the inquiring party's message in a multiple-choice question format; and by sending back the inquiring party a text message specifying the responding party's choice, which is made by pressing the numeric key corresponding to the choice, if and when the responding party makes a choice.

SMS is easily realized on the system and terminals by the use of the data transmission property native to the wireless network access method between the base transceiver station and the mobile station; is capable of sending and receiving short text message and voicemail notices as it has the same functions as bi-directional wireless paging; and defines high-level functions on IS-637 on the basis of the method of transmitting messages to Data Burst Message with the service option on ISO-95-A configured at 6 or 14.

SMS may be categorized into four types, message transmission, message reception, mobile broadcasting, and on-demand information. Massage transmission (MO SMS) is a service by which a simple message is transmitted from a terminal to another mobile terminal or an email address. Message reception (MT SMS), the most basic service, encompasses incoming voicemail notification and simple message reception functions, and the terminal on the receiving end may initiate a return call with the SEND key as the SMS protocol itself includes a Call Back Number function. Mobile broadcasting (Cell Broadcasting) is a service that push-delivers information packets to all or specific terminals, and the user may elect to receive or block particular type of information. On-demand information service (Information on Demand) may be effectuated by sequential operation of MT SMS and MO SMS or by the user's selective responses, and the user may receive specific information such as stock market information by choice.

BACKGROUND ART

Figure 1:
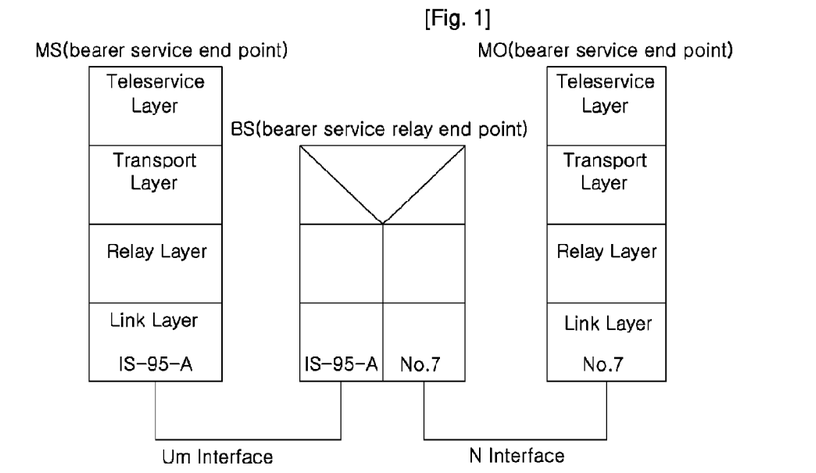
FIG. 1: Conceptual structure of existing SMS protocol.

The existing SMS protocol, as shown in FIG. 1, is conceptually composed of four levels, Teleservice, Transport, Relay and Link. The Teleservice level supports basic SMS functions with sub-parameters of Short Message Data Parameter (SMDP); the Transport level forms terminal points between the Service Message Center (SMC) and the terminal at the message transmission/reception phase, and confirms the status of communication readiness; the Relay level establishes the transmission channel in accordance with the status of the terminal and the length of the message; and the Link level adds information needed by the IS-95-A[or TDMA] protocol to the data and send the message to the SMC.

Figure 2:
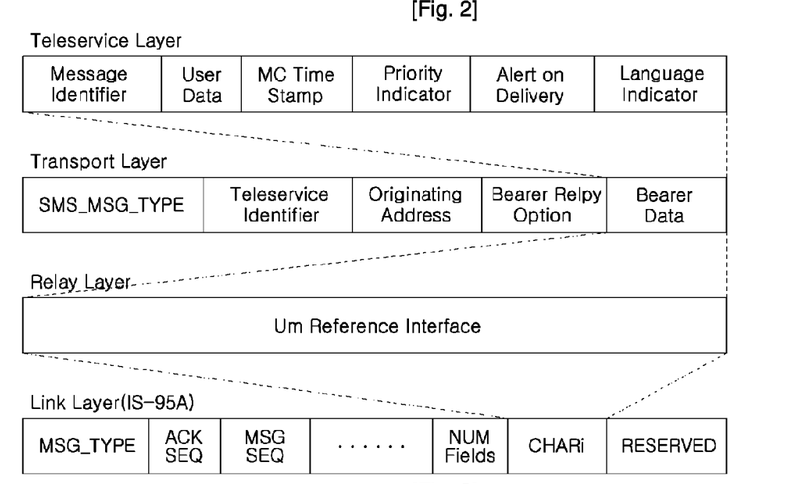
FIG. 2: Structure of existing SMS protocol parameters by level.

FIG. 2 shows the structure of existing SMS protocol parameters by level. The SMS parameter for CHARi message on the Link level is capsulated, and the parameters are analyzed and sent to the upper level. On the basis of Data Burst Message on IS-95-A[or TDMA] which functions as the Link level, and through Um Interface on the Relay level, the Transport level is formed. Transport level messages include Teleservice Identifier which is an identifier for voicemail and normal messages, Originating Address, Bearer Reply Option, and Bearer Data. Bearer Data forms the Teleservice level, and the Teleservice level provides application services. The Teleservice level comprises User Data which includes the content of the received message, Message Center Time Stamp, Priority Indicator, Privacy Indicator, Alert on Deliver, and Language Indicator.

SMS messages are not limited to mobile-phone-to-mobile-phone communication, but may also be transmitted from a computer. If a computer is used, the message is sent to a Message Center (MC) through the Internet and then the MC sends the text message to mobile phones, and the message can be sent to a number of mobile terminals in a short period of time.

However, as SMS formed on the basis of Data Burst Message (Link level) of IS-95-A[or TDMA], the size of the message may not exceed 200 bytes. Excluding the parameter information, the maximum size of a message is generally 160 bytes, and in Korea the maximum size is regulated at 160 bytes. Thus, a message that exceeds 160 bytes is sent in two or more messages, and the receiving mobile phone displays the message in two or more messages as well.

Due to the 160 byte limitation on data size in SMS, Multimedia Message Service (MMS) has been developed and used. However, while MMS enables transmission of voice, picture, and video data as well as unlimited-length text messages, the billing for MMS includes per-packet data usage charges in contrast to SMS per-message billing, and both the sender and receiver incur service charges. Commercial MMS messages are particularly unwelcome.

DISCLOSURE OF INVENTION

Technical Problem

The invention initiates a technical idea which allows for, without modifying existing Short Message Service (SMS) systems, composing on the terminal—be it a computer or mobile terminal—an IMS system comprising a control component, a message transmission component, a message receiver component, a message translation component, a message display component, a keypad input sensor component, a temporary storage component, and an IMS interface; and which allows for a method of utilizing said IMS system where the inquiring party sends a text message which includes multiple text choices between certain symbols, the responding party's terminal recognizes the multiple text choices and appropriately displays the text message and the multiple text choices with a number assigned to each choice, the responding party selects a choice by pressing the corresponding numeric key, and a responding message indicating the choice is automatically sent to the inquiring party.

In particular, the invention presents methods for utilizing existing SMS transmission systems and methods without modification with respect to appending IMS parameters such as time stamp, complete flag, and request/respond flag; for distinguishing whether a received IMS message is a request or a response to a request; and for recognizing a long message that exceeds the length of a message defined in SMS as a single message by dissecting and/or combining the message.

Additionally, a method is presented for improving the existing SMS and making use of an interactive message service, by means for appending IMS parameters such as said time stamp, complete flag, and request/respond flag to the parameters defined by the existing SMS transmission protocol.

Additionally presented is a purely text-based service system by which the inquiring party pays for the response to the inquiring message and in which no cost is incurred upon the responding party.

Technical Solution

The present invention relates to a system and method of transmitting text messages to and from mobile phones. The invention presents an interactive message service (IMS) system compatible with existing SMS systems without modification. In said IMS system, the inquiring party sends a text message in a multiple-choice question format to the responding party; the responding party makes a choice by pressing the numeric key corresponding to the choice; and then the selected choice is automatically sent back to the inquiring party.

This application presents a system in which an IMS system comprising a control component, a message transmission component, a message receiver component, a message translation component, a message display component, a keypad input sensor component, a temporary storage component, and an IMS interface is installed on the terminal be it a computer or mobile terminal; and in which the inquiring party transmits a text message which includes multiple text choices between certain symbols, the responding party's terminal recognizes the multiple text choices and appropriately displays the text message and the multiple text choices with a number assigned to each choice, the responding party selects a choice by pressing the corresponding numeric key, and a responding message indicating the choice is automatically sent to the inquiring party.

While the present invention may be embodied in various structures, the Applicants were able to compose the IMS system with a control component, a message transmission component, a message receiver component, a message translation component, a message display component, a keypad input sensor component, a temporary storage component, and an IMS interface as essential components.

The control component controls each function performed by other components; the message transmission component stores the IMS text message and transmits the message through the IMS interface; and the message receiver component receives an IMS text message from the IMS interface and stores the message.

The message translation component detects the designated symbols in the IMS text message and composes the data between the symbols in a multiple-choice format. Said translation component converts the symbols into identifiers such as STX (Start Transmission Extension) and ETX (End Transmission Extension) before the transmission of the text message. Said translation component also matches a responding message to a particular inquiring message when an IMS message is received.

Said designated symbols are pre-determined special symbols that are used to identify the beginning and end of the text data that constitutes multiple choices. Symbols that are infrequently used or specially made in the IMS system can be used as the designated symbols. Text choices separated by separators (for example ",") are placed between the designated symbols.

In an exemplary embodiment where the designated symbol is "¶", if the multiple-choice text data is composed as "¶text 1, text2, text3¶", the message translation component converts the data to "STX text1, text2, text3 EXT".

The message display component displays, on the display device or unit of the terminal, the IMS system as well as text messages when they are being composed or received. When receiving messages, said display component appropriately displays the multiple-choice data if the received message is an inquiring message, and appropriately connectedly displays the inquiring and responding messages if the received message is a response to an the inquiring message. The keypad input sensor component detects the key and the corresponding numeric value.

The temporary storage component is a memory component that stores a text message being composed, transmitted IMS message data, and received IMS message data; and also temporarily stores IMS message data when an IMS message is dissected into two or more messages or vice versa.

The IMS interface accommodates existing SMS. When an IMS text message is sent, the IMS interface checks the message transmission component for an IMS message to be transmitted, and generates IMS parameters and attach them to the message before transmission via SMS. When an IMS text message is received, the IMS interface determines whether the message is a normal SMS message or an IMS message, and relays the message to the message receiver component if an IMS message. In particular, the IMS interface performs the dissecting and combining functions if an IMS message exceeds the length defined by SMS.

Said IMS parameters are data necessary in an IMS system but are not defined in existing SMS systems, and include time stamp, complete flag, and request/respond flag.

In the time stamp data, the transmission time of the inquiring message is stored. By the attachment of the same time stamp to the responding message, it becomes possible to match the two messages. Additionally, when an IMS text message is dissected into two or more message due to it length, a same time stamp is attached to the dissected messages attributing them to the single message.

The complete flag is used for an IMS message transmitted in two or more pieces. Generally, a value of "1" is assigned to a non-dissected IMS message, and a value of "0" is assigned to dissected messages. The last dissected message however is assigned with a value of "1", informing the receiving terminal that the reception of all dissected messages with the same time stamp is completed.

The request/respond flag indicates whether a message is an inquiring or a responding message. "0" may be used for an inquiring message and "1" may be used for a responding message.

Said IMS parameters are ideally added to the parameters on the existing SMS protocol, but modifying the existing SMS protocol would incur time and cost. Therefore, in this application, said IMS parameters are placed before User Data of the SMS protocol and each dissected IMS message is assigned with the IMS parameters; and thus existing SMS systems need not be changed.

In addition, wireless telecommunication providers may identify a message as an IMS text message by the use of said IMS parameters, and bill the inquiring party for an IMS text message if the complete/respond flag indicates a response to an inquiring message. Thus a service system that incurs no cost for the responding party may be provided.

While various embodiments of the present invention may exist, the applicants present the core structure and operational principle with an exemplary embodiment that includes drawings. The terms and words used in this description and the claims shall not be interpreted with their strictly literal meanings, and upon the principle that words and terms may be defined appropriately to best explain the invention and the ideas incorporated in the invention, the words and terms shall be interpreted in accordance with the invention and the ideas incorporated in the invention.

Figure 3:
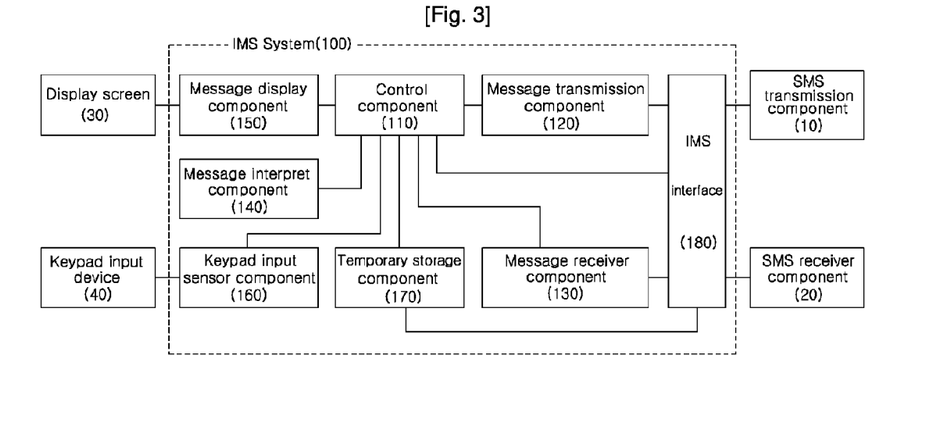
FIG. 3: Structure of IMS system by function.

FIG. 3 shows the structure of an IMS system by function. The IMS system (100) comprises a control component (110), a message transmission component (120), a message receiver component (130), a message translation component (140), a message display component (150), a keypad input sensor component (160), a temporary storage component (170), and an IMS interface (180); and text data is transmitted and received with the use of the SMS transmission component (10) and SMS receiver component (20) of existing SMS systems.

Figure 4:
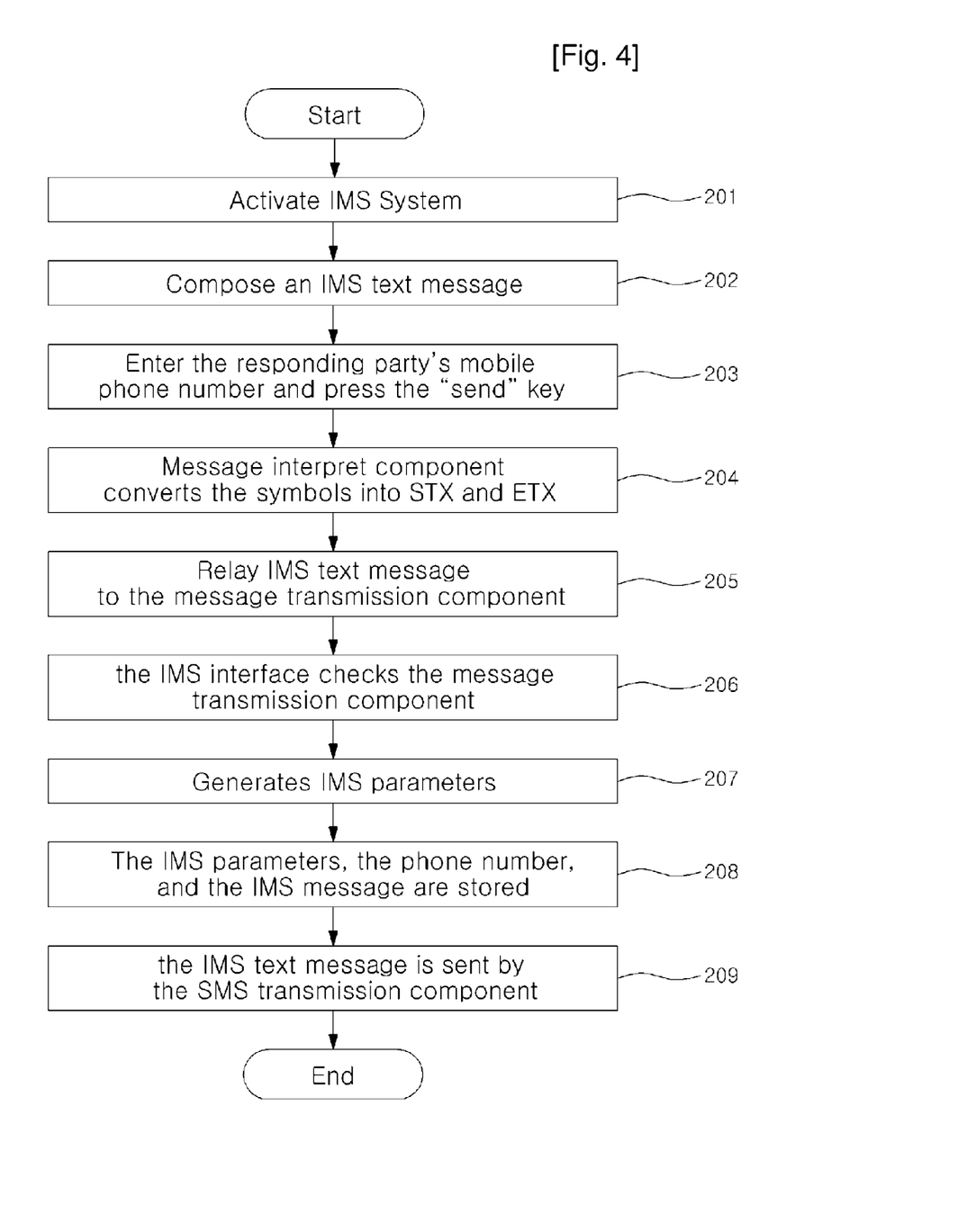
FIG. 4: Structure of IMS data.
Figure 5:
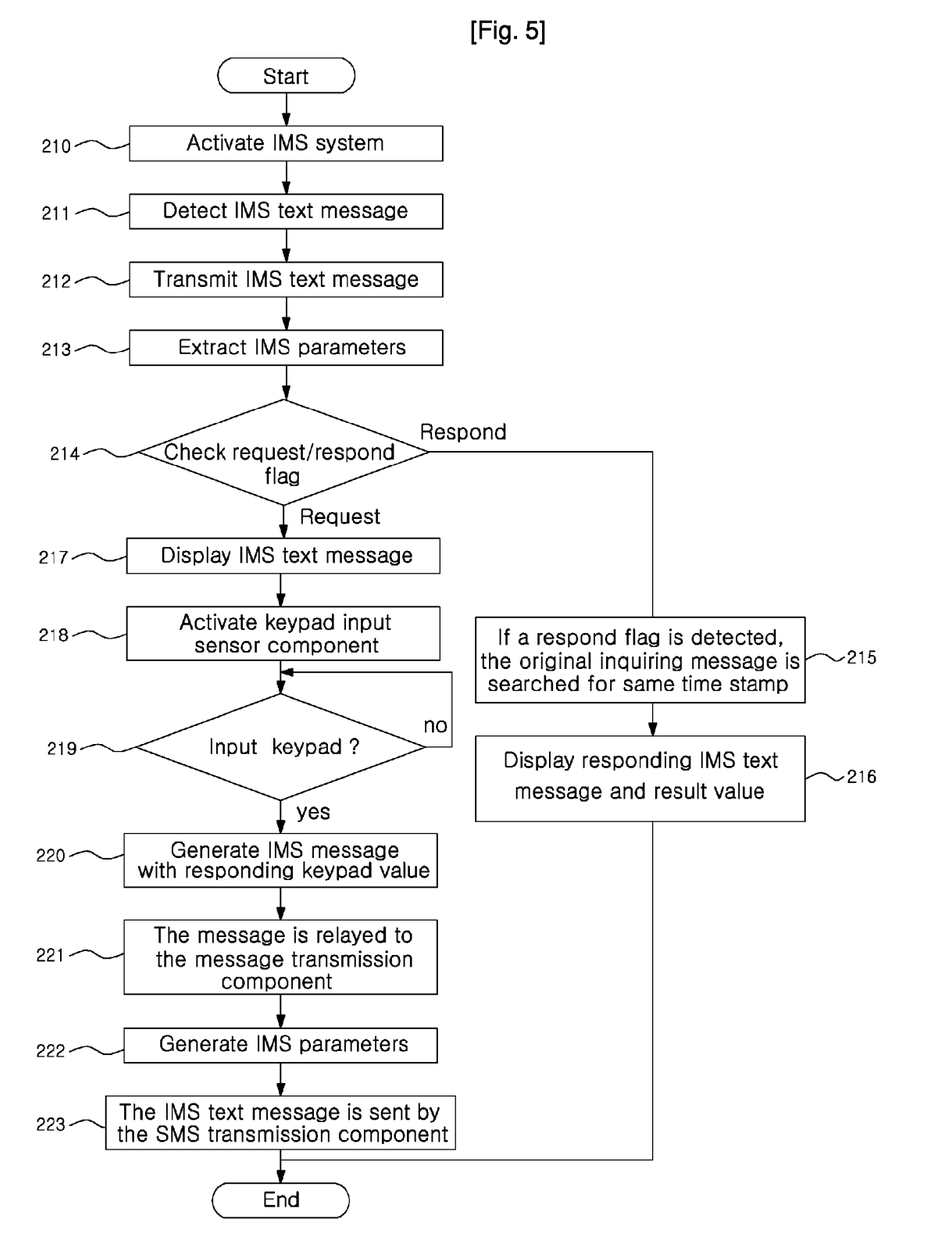
FIG. 5: Structure of IMS protocol parameters.

FIGS. 4 and 5 show operation sequences of an IMS system. FIG. 4 shows the transmission sequence; FIG. 5 shows the reception sequence.

The IMS system operation sequence for transmission of an IMS text message is, as illustrated in FIG. 4, as follows: the IMS system (100) is activated <201>; the inquiring party composes an IMS text message comprising a question, and response choices separated by separators and placed between certain designated symbols <202>; the inquiring party enters the responding party's mobile phone number and request transmission of the message by pressing the "send" key <203>; the message translation component (140) converts the identifiers into STX and ETX <204> and relays said IMS text message to the message transmission component (120) <205>; the IMS interface (180) checks the message transmission component (120) for an IMS text message to be transmitted <206> and generates IMS parameters (time stamp, complete flag, and request flag) <207>; the IMS parameters, the responding party's phone number, and the IMS message is stored in the temporary storage component (170) <208>; and the IMS text message is sent by the SMS transmission component (10) <209>.

The IMS system operation sequence for reception of an IMS text message is, as illustrated in FIG. 5, as follows: the IMS system (100) is activated <210>; the IMS interface (180) detects the IMS text message received by the SMS receiver component <211> and stores said message in the message receiver component (130) <212>; the message translation component (140) extracts IMS parameters from the received IMS text message <213> and checks the request/respond flag <214>. If a respond flag is detected, the original inquiring message is searched for <215> and displayed appropriately by the message display component (150) <216>. If request flag is detected, the text data separated by separators and flanked by STX and ETX identifiers is displayed appropriately as number-assigned multiple choices by the message display component <217>, the keypad input sensor component is activated <218> and detects the key pressed by the responding party <219>, an IMS message is generated which includes the value assigned to the pressed key <220>, and the message is replay to the message transmission component <221>. With respect to generating IMS parameters for the responding message <222>, the IMS interface (180) synchronizes the times stamp to that of the inquiring message, generates and configures the respond flag, and respond to the inquiring message via the SMS transmission component <223>.

Figure 6:
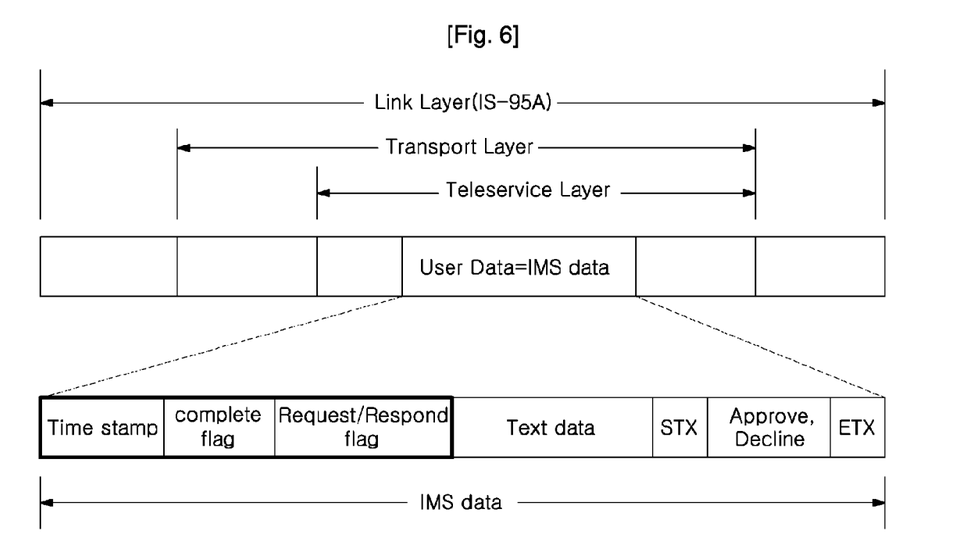
FIG. 6: Example of operation sequence of IMS system when IMS text message is sent.

FIG. 6 shows the composition of IMS data that uses existing SMS. User Data where SMS text data is stored contains IMS parameters such as time flag, complete flag, and request/respond flag followed by text data. As the IMS parameters are contained in User Data, the storage for text data currently limited to 80 bytes in Korea—is reduced.

Said time stamp, complete flag, and request/respond flag is generated in the IMS interface (180). In the IMS interface (180), on the basis of the generated parameters, the native data is dissected, mapped, and transmitted in the size allowed for a single SMS message; and on the receiving end the native data is separated and/or extracted.

In other words, an IMS message is distinguished from a normal SMS message on the basis of the IMS parameters attached to the header of text data. If there are no IMS parameters, the message is treated as a normal SMS message; if there are IMS parameters, the message is identified by the IMS interface as an IMS message and pushed to the IMS system. In particular, the designated special symbols are converted to STX and EXT before transmission, and the message transmission component (140) extracts data to be displayed as multiple choices on the basis of the identifiers and separators. For example, STX approve, decline, report ETX is displayed as "1. Approve 2. Decline 3. Report" which corresponds to numeric keys.

Figure 7:
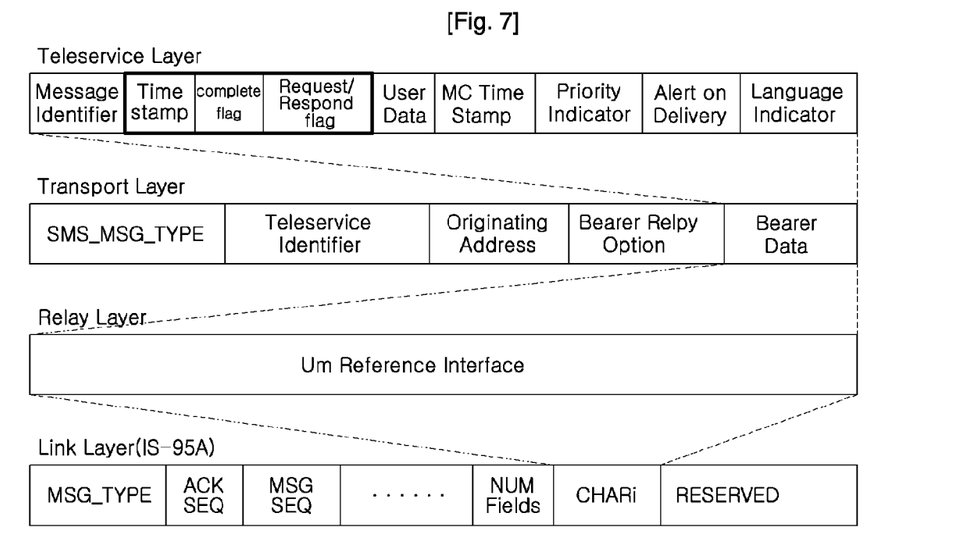
FIG. 7: Example of operation sequence of IMS system when IMS text message is received.

FIG. 7 shows the parameter structure of an IMS protocol by level in an embodiment of the present invention. IMS parameters of time stamp, complete flag, and request/respond flag are add upon existing SMS protocol parameters. Said IMS parameters are located in the Teleservice level.

Figure 8:
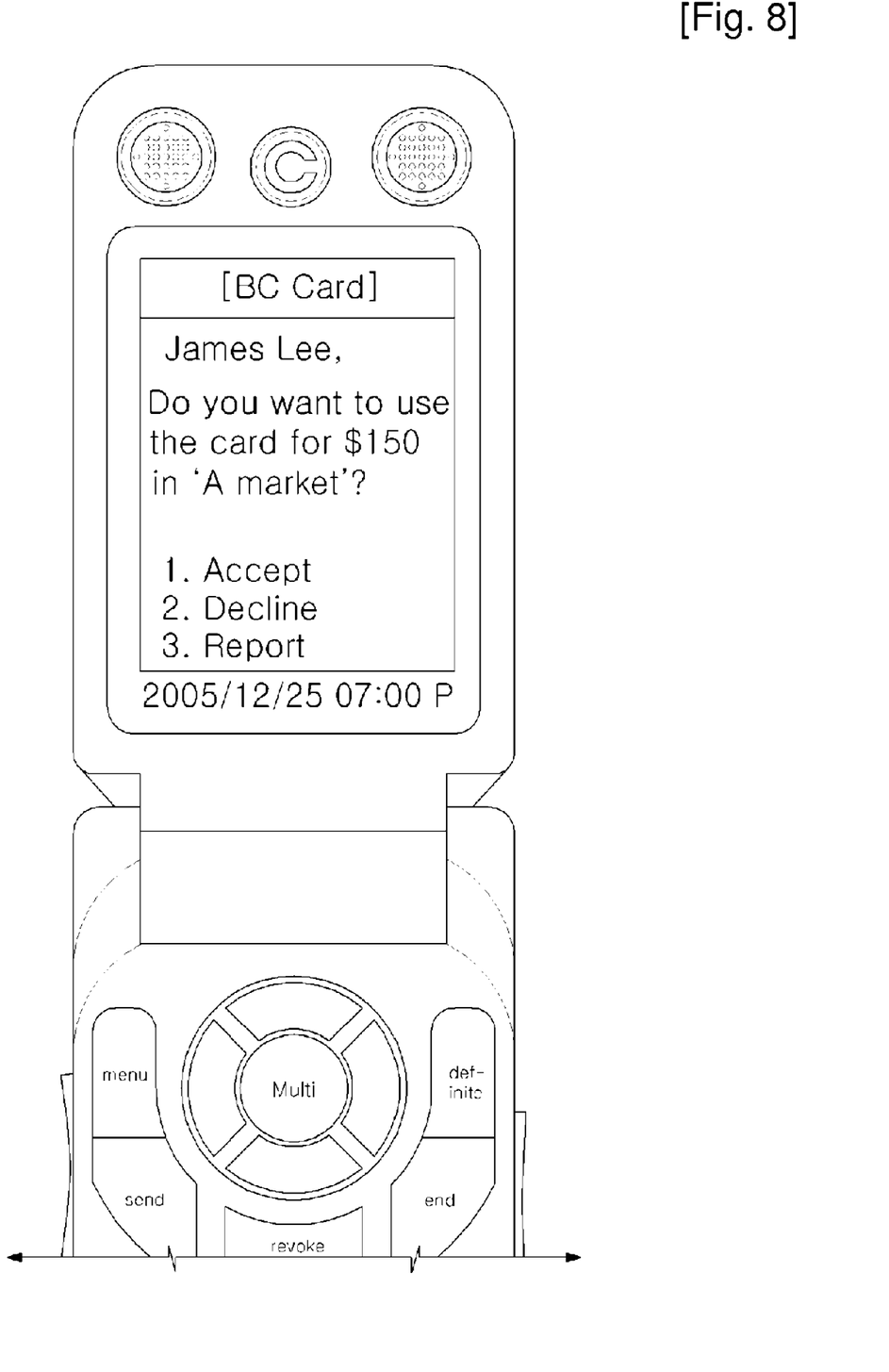
FIG. 8: Example of IMS message.

FIG. 8 shows the workflow of an embodiment of the present invention where "Hong Gil-Dong" buys "Mobile Phone B" from "Market A" at "15 thousand won" with a credit card issued by "Credit Card Company C." The credit card company or an authorization agency sends an IMS message such as the one shown to the credit card holder's pre-designated mobile phone number. Only after the credit card holder receives the IMS message and issue an authorization by pressing the "1" key on the mobile phone, the credit card payment is cleared.

In said embodiment, the IMS data is composed as [time stamp|complete flag|request flag| Hong Gil-Dong, do you wish to purchase \"Mobile Phone\B"from\"Market A\"at\"150,000won\"?-Credit Card Company C|STX Approve, Decline, Report ETX"]. If the data needs to be dissected into two pieces, [time stamp|complete flag|request flag|Hong Gil-Dong, do you wish to purchase \"Mobile Phone B\"from \"Market A\"at\"150,000won\"?] and [time stamp|complete flag|request flag|-Credit Card Company C|STX Approve, Decline, Report ETX"] are transmitted. The two dissected IMS messages contain the same time stamp, while the complete flags for the first and second dissected IMS messages are set at "0" and "1" respectively.

Figure 9:
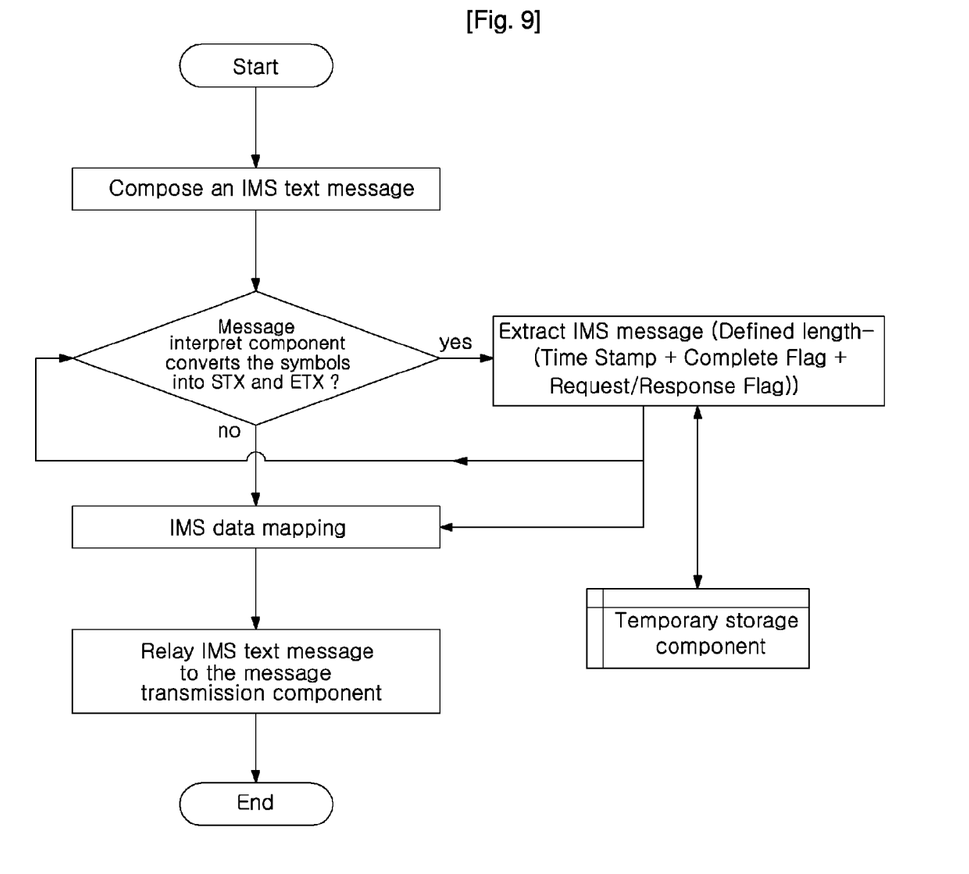
FIG. 9: Example of text data spread over two or more messages in IMS interface and transmitted.
Figure 10:
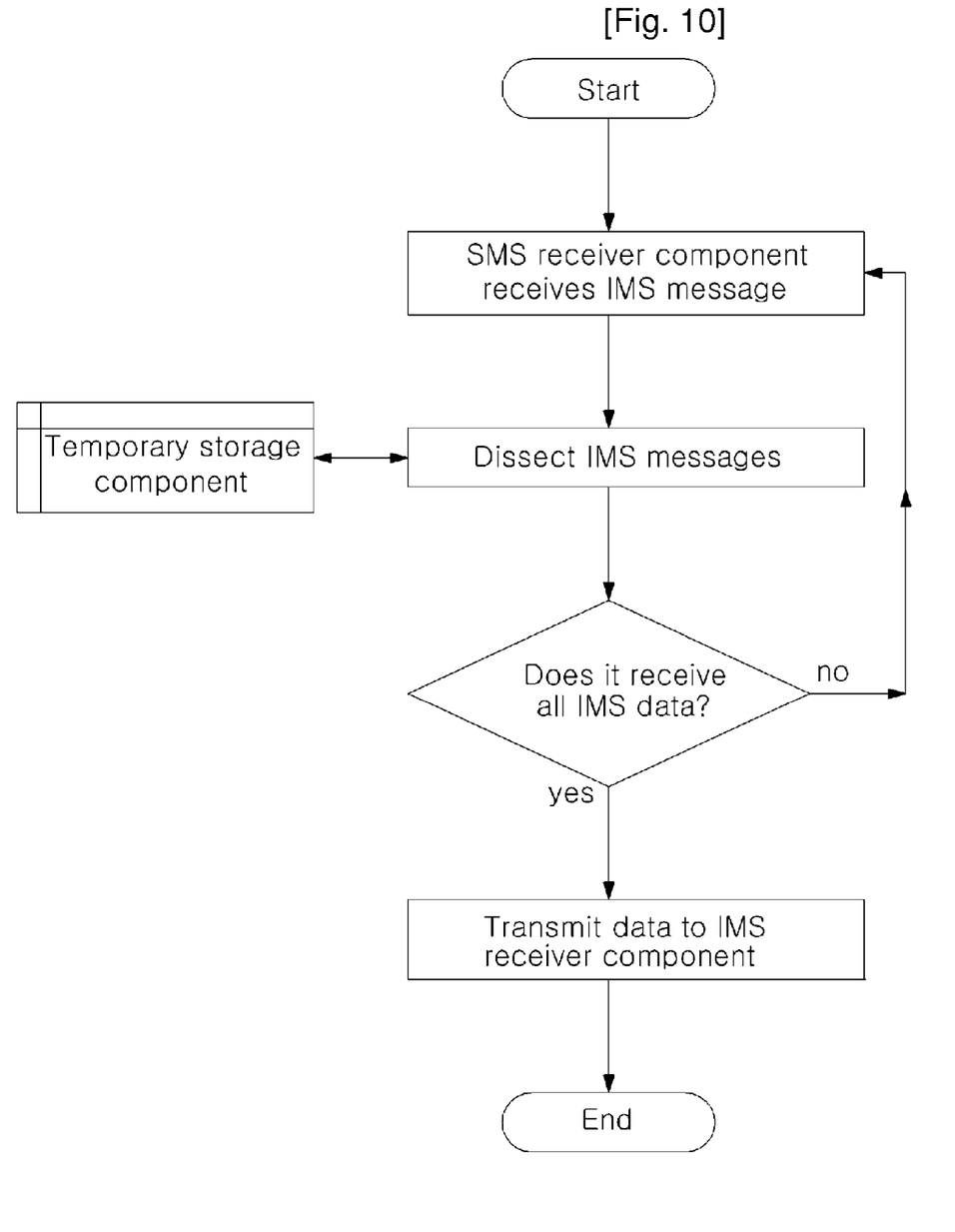
FIG. 10: Example of recombination of text message dissected into two or more IMS message in IMS interface and transmitted.

FIGS. 9 and 10 show methods relating to transmission of an IMS text message dissected and re-combined in the IMS interface in an embodiment of the invention. FIG. 9 shows the transmission sequence, and FIG. 10 shows the reception sequence.

In FIG. 9, the IMS interface (280) detects IMS text data in the message transmission component (130); determines whether the IMS text data exceeds the length defined in SMS; extracts text data in the length defined in SMS less the length of the IMS parameters, if the data exceeds the SMS-defined length; maps the extracted data in IMS data and transmits the data; and repeats the process for the remainder of the original IMS data.

As illustrated in FIG. 10, when receiving dissected IMS messages, the IMS interface extracts IMS parameters from the received IMS data and checks the complete flag. If not completed, IMS messages with a same time stamp are stored in the temporary storage component (170). When an IMS message marked complete is received, the IMS messages with a same time stamp are relayed to the message receiver component.

While an exemplary embodiment of the present invention is illustrated and explained above, it is to be understood that the invention may be embodied in various ways by those of ordinary skill in the art without departing from the scope and spirit of the invention provided by the claims of this application.

Advantageous Effects

By utilizing an embodiment of the present invention, when the receiving party's response is needed, the inquiring party may compose an inquiring IMS message and send it to the receiving—or responding—party; and the response is automatically sent back to the inquiring party when responding party simply presses a numeric key corresponding to the response choice.

In addition, unlike existing SMS systems, the present invention allows for the inquiring party to pay for the response to the inquiring message, thus relieving the responding party from incurring charges and enabling the responding party to respond without burden.

In particular, the IMS system presented in this application may be used for various applications including transmission of a credit card payment authorization request to the mobile phone number designated by the credit card holder in advance; transmission of an authorization request to the person whose credit information is inquired when said person's credit information in inquired; and transmission of multiple-choice survey questions.

DESCRIPTION OF SYMBOLS USED IN FIGURES

10: SMS transmission component
20: SMS receiver component
30: Display screen
40: Keypad input device
100: IMS system
110: Control component
120: Message transmission component
130: Message receiver component
140: Message translation component
150: Message display component
160: Keypad input sensor component
170: Temporary storage component
180: IMS interface

BEST MODE FOR CARRYING OUT THE INVENTION

In a preferred embodiment of the invention, a program is installed on each user's mobile phone via CALLBACK URL SMS SERVICE. Said program, which processes messages with a certain predefined code or symbol, displays an inquiring message in a multiple-choice format, and automatically generates and sends a responding message when a numeric key corresponding to a choice is pressed. The responding message from the user is processed by MO SMS (Mobile Originated Short Message Service) of the wireless telecommunication service provider. The inquiring and responding messages may also be encrypted for enhanced security.

Mode for the Invention

Said program is designed to perform optimally in various mobile phone platforms, and is easily and automatically installed on mobile phones via CALLBACK URL SMS SERVICE. Said program requires a protocol so that it processes only messages with a certain predefined code or symbol, and processes the messages using MO SMS, MOBILE INTERNET, or MOBILE NETWORK of a wireless telecommunication service provider. The messages are encrypted by the program for enhanced security.

Industrial Applicability

The inquiry and response method presented by the invention may be used for fast remote communication. For example, in case of fire, the emergency administrator may be notified of the situation detected by a heat sensor, and appropriate action instructions may be quickly inquired and given. In another example, a survey may be conducted in a more effective way than an existing low-return method using ARS.

Sequence Listing

N/A

The invention claimed is:
1. A system for text message service, comprising:
a SMS (Short Message Service) system configured to include an SMS transmission component and an SMS reception component, and an IMS (Interactive text Message Service) system configured to sending IMS messages using the SMS system as a communication medium,
wherein the IMS system comprises:
a message translation unit for constructing a request message-type IMS text message by interposing a multiple choice-type answer menu of a text message, entered by a user, between identifiers and also separating answer options using separators, determining whether a received IMS text message is a request message or a response message by checking a request/response flag of the received IMS text message, and, if it is determined that the received IMS text message is a response message, checking a time stamp of the received IMS text message and searching for a request message having a time stamp identical to the time stamp of the received IMS text message;

a message transmission component for storing the IMS text message, constructed by the message translation unit, which will be transmitted via the SMS transmission component;

a message reception component for storing the IMS text message which was received by the SMS reception component;

an IMS interface for relaying communications of IMS text messages between the message transmission component and the SMS transmission component and between the message reception component and the SMS reception component, and adding IMS parameters, including a time stamp indicative of transmission time and a request/response flag, to a teleservice layer of the SMS protocol for the constructed message and then allowing sending SMS transmission of the constructed message; and a message output component for, if the received IMS text message is a request message, outputting the corresponding text message including the answer menu configured using the identifiers and the separators, and, if the received IMS text message is a response message, outputting the corresponding response message.

2. The system of claim 1, wherein the IMS interface splits the IMS text message to be transmitted when a size of the IMS text message exceeds a size suitable for a single transmission of the SMS system, and checking the IMS parameters in which a completion flag indicative of a split IMS text message was included and then combining together two or more received split IMS text messages.

* * * * *